United States Patent [19]

Knutson et al.

[11] 4,350,110
[45] Sep. 21, 1982

[54] INTEGRATED FAIRED TOWLINE WITH INTEGRAL LOCKING FEATURE

[75] Inventors: Richard K. Knutson, Gaithersburg; Bruce L. Webster, Bethesda; John W. Johnston, Gaithersburg, all of Md.; Peter P. Rispin, Washington, D.C.

[73] Assignee: The United States of America as represented by the Secretary of the Navy, Washington, D.C.

[21] Appl. No.: 221,157

[22] Filed: Dec. 29, 1980

[51] Int. Cl.³ .............................................. F16D 1/10
[52] U.S. Cl. ................................ 114/243; 174/101.5
[58] Field of Search ..................... 114/243; 174/101.5, 174/42; 52/84

[56] References Cited
U.S. PATENT DOCUMENTS 3,227,398  1/1966  Struble ................................ 114/243
3,343,516  9/1967  Nichols ............................... 114/243
3,352,274  11/1967  Calkins ............................... 114/243
3,547,068  12/1970  Kramer ............................... 114/243
3,613,627  10/1971  Kennedy ............................. 114/243

Primary Examiner—Trygve M. Blix
Assistant Examiner—D. W. Keen
Attorney, Agent, or Firm—R. F. Beers; L. A. Marsh

[57] ABSTRACT

A streamlined fairing comprises an elongated leading edge tension member, an elongated trailing edge member of flexible material integrally bonded to the leading edge member, and a flange member secured to the leading and trailing members for preventing relative displacements therebetween and for improving the shape stability of the fairing. The flange member has a cross-sectional width which is between about 10% and about 50% of the maximum width of the fairing and a cross-sectional length which is between about 5% and about 20% of the chord length of the fairing.

8 Claims, 6 Drawing Figures

INTEGRATED FAIRED TOWLINE WITH INTEGRAL LOCKING FEATURE

BACKGROUND OF THE INVENTION

The present invention relates to a streamlined low-drag, high strength towline for towing underwater devices at depths and speeds heretofore unattainable.

High drag forces on towed devices tend to cause the device to stream out near the water surface behind the towing vessel unless depressing forces are applied to submerge the device. These depressing forces are usually applied by means of flaps and control surfaces on the towed devices, wherein the resultant depressing forces and drag forces on the towed devices are carried as tension forces in the towing cables or faired towlines that extend between the ship and the towed devices.

Although steel tow cables have been widely used to tow various submerged devices at shallow depths and low towing speeds, the increased towing speed and depth requirements for many modern towed systems has necessitated the use of faired towlines which are stronger and less ponderous than steel towing cables. For example, when sonar devices are used at great towing depths and at fast towing speeds high tension forces are produced which generally necessitate the use of stronger cables. However, since recent strength improvements in steel fiber materials for steel towing cables have been minimal, the usual recourse is to enlarge the cross-sectional size of the steel cable to accomodate the higher tension forces. But, since drag is a function of the frontal area of the towline and since the increased weight of the cables accordingly increases the tension forces in the cable, a practical length limit is soon reached where conventional steel cables become unduly ponderous for towing submerged devices at great depths and high speeds.

Drag forces on towlines also depend upon the shape of the towline and, to reduce drag forces encountered with round towing cables, streamlined fairing segments have been developed for attachment to the cables. These fairing segments normally have a streamlined profile with a tapered trailing edge portion to provide smooth fluid flow therearound. However, when such segmented fairing elements are attached to the cable a complex towing structure is produced, which not only may create undesirable turbulence and noise, but also may increase storage and handling problems as a consequence of the bulky cable, the segmented fairing elements and numerous connecting elements.

An improved form of a towline has been developed which incorporates the cable or tension member and the fairing segments into an integrated, unitary faired towline or fairing which is devoid of joints, fasteners and fairing segments that tend to increase fluid turbulence, drag, and noise. By virtue of a rounded leading edge and a tapered trailing edge to minimize drag and noise, the integrated fairing is generally non-ventilating, non-cavitating and hydrodynamically efficient. Examples of streamlined, unitary fairings are generally represented by U.S. Pat. Nos. 3,227,398; 3,304,364; 3,352,274; 3,433,020; 3,611,976; and 3,613,627. In general these fairings are composite members which include a leading edge portion utilized as a strength member and a tapered trailing edge portion. However, attempts to use some of these fairings at preselected depths and towing speeds, and at a predetermined orientation beneath the towing vessel have often been unsuccessful due to "kiting" instabilities and erratic deflection of the fairing during towing operations. For example, towing tests with fairings of the type shown in U.S. Pat. No. 3,613,627 have shown the fairing to be susceptible to hydrodynamic and mechanical instabilities as well as shape asymmetries that produce excessive towline kiting. Preliminary evaluation of this integrated fairing design indicates that kiting of the fairing results from a failure of the bond at the interface between the leading edge strength member and the trailing edge portion of the fairing. Such interface failure along that length of the fairing presumably causes irregular lateral displacement of the tapered trailing edge portion relative to the strength member to produce a longitudinal shape asymmetry in the fairing. Shape asymmetry occuring in a portion of the fairing causes unbalanced hydrodynamic forces thereabout which makes it especially difficult to maintain the fairing at a predetermined orientation during towing operations.

SUMMARY OF THE INVENTION

The present invention overcomes problems experienced with the prior art by providing an integrated towline fairing comprising a leading edge strength member and a trailing edge fairing body, wherein means are provided at the interface between the fairing portions to preclude lateral displacements therebetween. This is generally accomplished by forming a projecting flange on the aft surface of the strength member, along the interface, to prevent lateral displacements of the fairing body. The flange, which constitutes a "locking" means and is preferably of a dove-tailed, a rectangular or a nodular cross-section, is of predetermined dimensions with respect to the size of both the strength member and fairing body to preclude lateral displacement of the fairing body while not otherwise reducing the flexibility and handling capabilities of the fairing. Additionally, the flange has surface regions which are offset from and nonparallel to the primary interface surface between the strength member and fairing body to more efficiently accomodate shear forces acting along the interface between the fairing section. Further, the fairing may have a truncated trailing edge portion that provides improved flow stability for the fairing. A thin covering or skin is bonded to the leading edge strength member and the trailing portion of the fairing to assist in bonding the fairing portions together, to increase the abrasion resistance of the fairing and to reduce the magnitude of the surface drag forces on the fairing.

Accordingly, an object of the invention is to provide a towing element which is highly stable at rapid tow speeds and great depths.

Another object of the invention is to provide a stable, low noise, low drag towing element which has a minimal tendency to "kite" or deflect from a predetermined towing orientation.

A further object of the invention is to provide an integrated towing element of a simplified yet efficient design which is inexpensive to manufacture and maintain.

Still another object of the present invention is to provide a flexible towing cable which can be easily deployed and retrieved, and which has high lateral stability.

The novel features characteristic of this invention are set forth with particularity in the appended claims. The invention itself, however, both as to its organization and method of operation, together with further objects and advantages thereof, may be best understood by reference to the following description taken in connection with the accompanying drawings, in which:

DETAILED DESCRIPTION OF THE DRAWINGS

Figure 1:
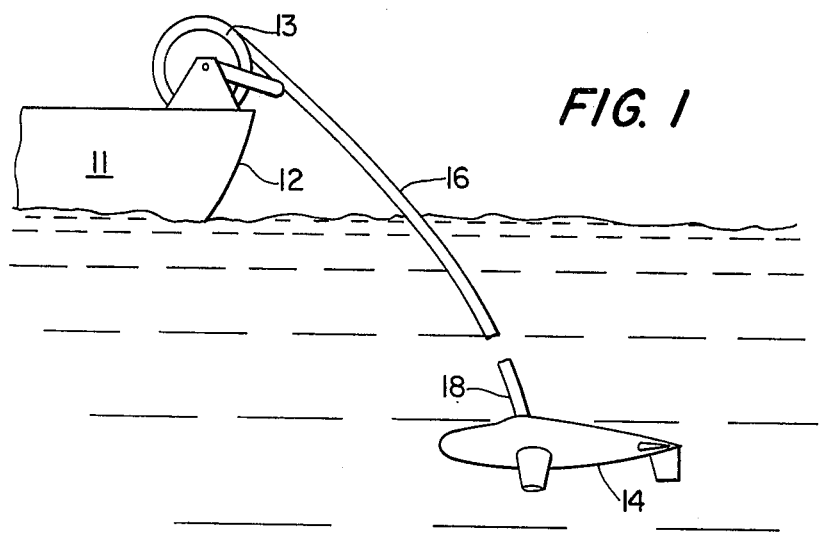
FIG. 1 is a pictorial diagram showing the fairing element in its normal catenary contour during towing operations.

Referring now to the drawings and in particular to FIG. 1, there is generally shown an elongated fairing element 16 deployed behind the stern 12 of a vessel 11 wherein the fairing 16 is conventionally connected to vessel 11 by means of a "take-up" winding drum 13 rotatably secured to the stern 12 of vessel 11. The remote end portion 18 of fairing element 16 is connected to a submersible towed device 14 such as a depressor, a paravane, or a sonar device. The normal operating depths for submerged devices 14 of the aforementioned kind are on the order of hundreds of feet and, consequently, considerable fairing lengths are often required to form a towing system. Thus, the fairing element 16 must be strong enough to support large towing loads at great depths and have sufficient flexibility to allow easy deployment (and retrieval) of fairing 16 from storage drum 13. The fairing 16 should also have a high degree of symmetry and lateral or transverse stability to preclude lateral deflection, twisting, and "kiting" of the fairing 16 from the desired tow orientation. Furthermore, fairings used for high speed towing operations at significant depths must also exhibit low drag by virtue of a small, hydrodynamically efficient frontal area, and a noncavitating, hydrofoil-shaped trailing portion.

The tow stability of a hydrodynamically efficient fairing 16 is normally assured by maintaining the center of tension (CT) in fairing 16 forward of the hydrodynamic center (HC), wherein the center of tension (CT) is located at the centroid of the tension forces in fairing 16, and the hydrodynamic center (HC) is defined as the point through which the resultant lift and drag forces act on fairing 16. The hydrodynamic center (HC) is normally located about one-fourth of the chord distance from the leading edge of fairing 16 for NACA-shaped fairings, as shown for example in FIGS. 2 and 3.

In practice, the center of tension (CT) usually coincides with the center of rotation (CR), which is the longitudinal axis about which fairing 16 will rotate when unbalanced lift and drag forces act on fairing 16. Therefore, if the center of rotation (CR) and, consequently, the center of tension (CT) can be maintained forward of the hydrodynamic center (HC) during towing, the fairing will normally exhibit high tow stability.

The location of the center of tension (CT) and the center of rotation (CR) primarily depends upon the product of the modulus of elasticity (E) of the different sections of the fairing 16 and the cross-sectional area occupied by each section.

Figure 3:
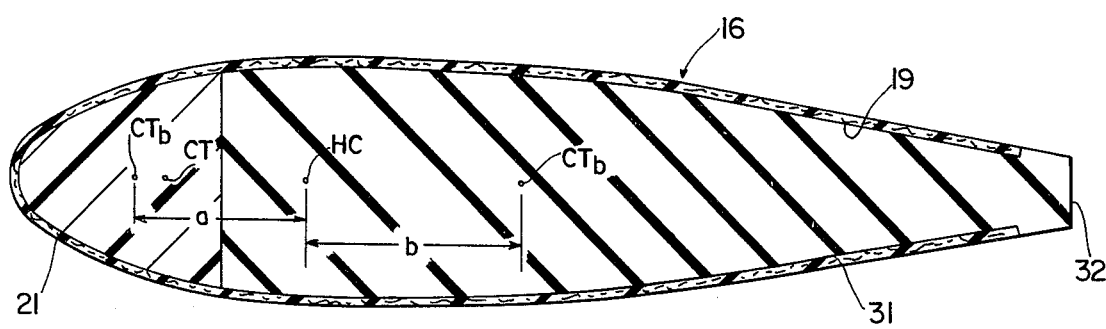
FIG. 3 is a cross-sectional view of a streamlined, integrated fairing in which the centers of tension of respective sections are shown.

For example, FIG. 3 illustrates a cross-section of a composite, integrated fairing 16 in which the leading and trailing portions 21, 31 of fairing 16 have resultant centers of tension ($CT_a$, $CT_b$) which are spaced at distances "a" and "b" from the hydrodynamic center (HC). As fairing 16 moves through the water to assume a catenary shape, as shown in FIG. 1, the trailing or aft portion 31 is deformed more than leading portion 21 so that the center of tension ($CT_b$) of trailing portion 31 moves aft toward the trailing edge 32 of fairing 16. As a result, the resultant center of tension (CT) of fairing 16 shifts toward trailing edge 32 of fairing 16, and if the resultant center of tension (CT) substantially coincides with the hydrodynamic center (HC) or moves aft of it, fairing 16 becomes unstable and tends to flip or oscillate from side to side about the center of rotation (CR). Accordingly, the leading portion 21 of fairing 16 should comprise the primary tension portion of fairing 16, wherein the leading portion 21 should have as high a modulus of elasticity as possible.

The tension member or leading portion 21 of fairing 16 is preferably made of a fiber of filament reinforced composite in which the filaments are normally unidirectional with their axis extending parallel to the length or longitudinal direction of fairing 16. Examples of suitable fiber materials include glass, graphite, boron, metal, and various high strength plastic and polymeric materials. Various matrix materials such as epoxy or metal may be utilized to bind the fibers together. The trailing portion 31 of fairing 16 is preferably formed of a flexible low modulus of elasticity material, such as an elastomer, which is bonded or otherwise continuously glued to leading portion 21 to form a unitary, integrated fairing 16. A covering 19 can be applied to the exterior surfaces of leading and trailing fairing portions 21, 31 to help bind the portions together to provide toughness and abrasion protection, and to reduce the magnitude of surface drag forces on the fairing.

Figure 2:
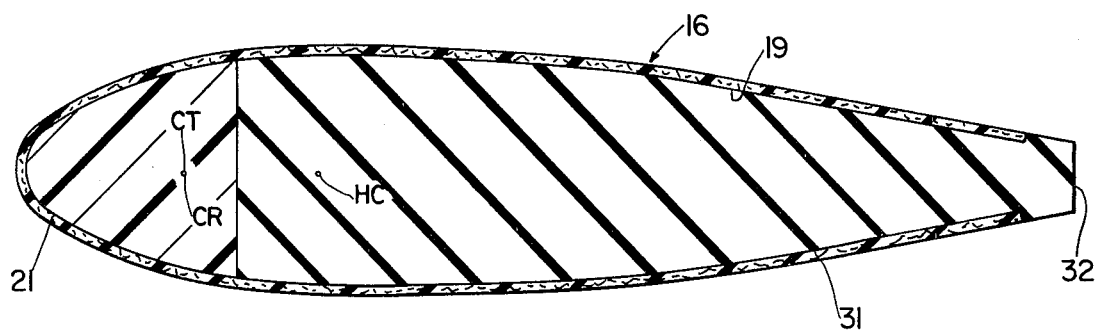
FIG. 2 is a cross-sectional view of a streamlined, integrated fairing illustrating the resultant hydrodynamic, tension and rotation centers.
Figure 5:
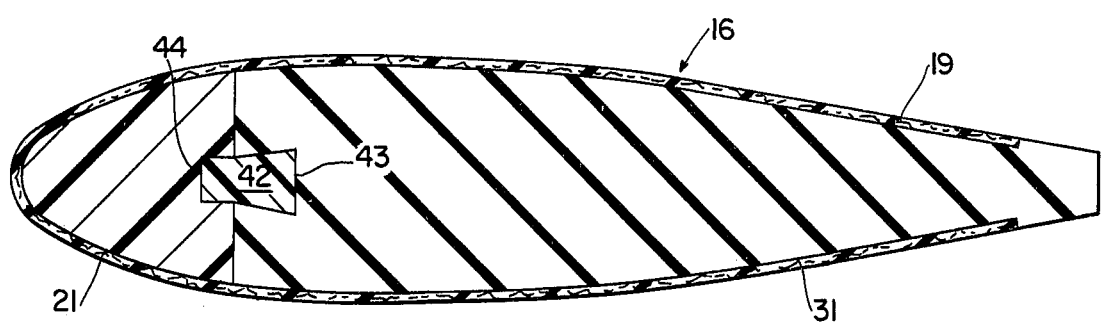
FIG. 5 is a cross-sectional view of another fairing element in which the strength member has a dovetailed cross-sectional shape.
Figure 6:
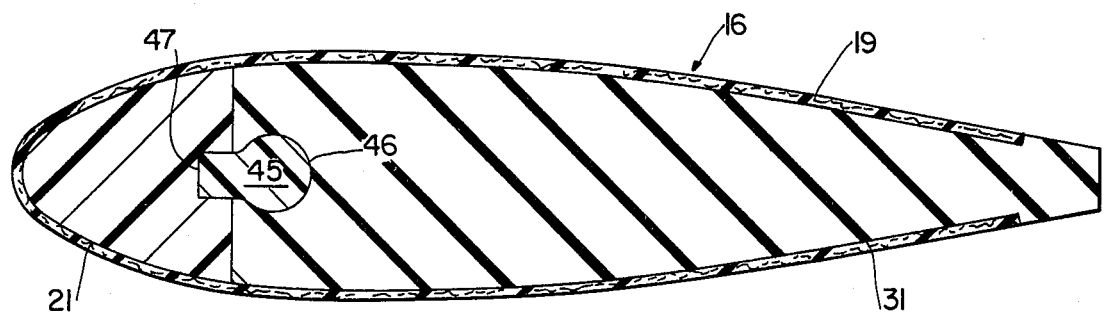
FIG. 6 is a cross-sectional view of still another fairing element in which the strength member has a rounded, nodular cross-sectional shape.

With some integrated fairings having planar interfaces between the leading and trailing portions of the fairing, as shown for example in FIG. 2, small shape asymmetries tend to develop in the fairing which cause unbalanced lift and drag forces thereon that produce hydrodynamic "kiting" and erratic deflections of the fairing. It was found that these small shape asymmetries are caused by localized breakdowns of the bond at the interface 25 formed between the leading and trailing portions of the fairing. Such separations may be produced, for example, during retrieval (and deployment) of the fairing 16 as it is wound (and unwound) around storage drum 13, wherein the leading edge portion 21 of fairing 16 is positioned closer to the drum axis than the trailing portion 31 of fairing 16. This causes the trailing portion 31 to be more highly deformed than the leading portion 21, resulting in the development of shear stresses between the leading and trailing portions that cause the portions to separate at the interface 25. It was discovered that these bond separations could be precluded by providing a symmetrical locking feature of predetermined dimensions at the interface 25 between fairing portions 21, 31. Such locking means are generally shown in FIGS. 4 through 6.

Figure 4:
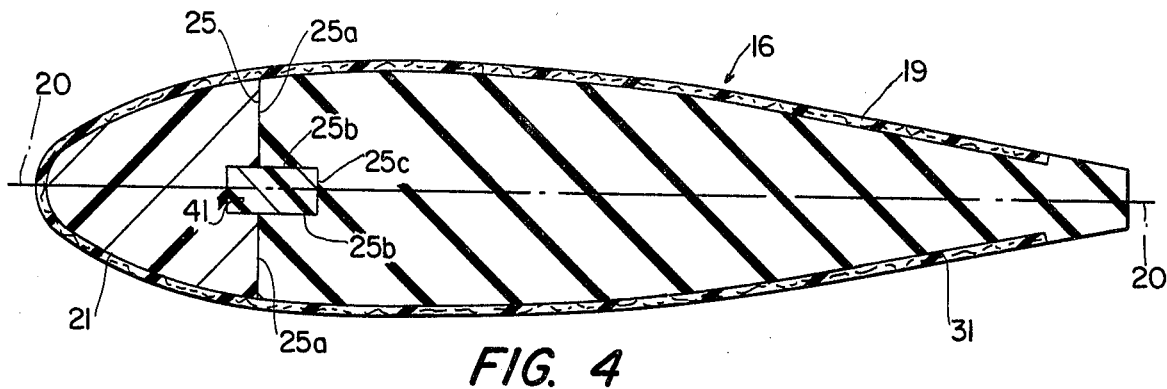
FIG. 4 is a cross-sectional view of the fairing element of FIG. 1 in which the leading edge portion of the fairing has a rectangular shaped strength member.

Referring now to FIG. 4 there is shown a fairing 16 comprising leading portion 21, which forms the strength member; trailing portion 31; and a locking means in the form of a rectangularly shaped flange 41 secured to leading portion 21. The flange 41 may be integrally formed with the leading portion 21 or formed as a separate member which is secured thereto, as shown in FIG. 4. The fairing 16 includes a cover 19 that substantially encloses the leading and trailing portions 21, 31.

The flange 41, which extends along the rear surface of leading portion 21, is symmetrically arranged with respect to the longitudinal chord axis, as represented by line 20—20 in FIG. 4, to balance the resulting longitudinal and transverse stress patterns generated in fairing 16 by the hydrodynamic drag and tension forces. The modulus of elasticity (E) of the flange member 41 is preferably less than or equal to the modulus of leading portion 21 and greater than the modulus (E) of trailing portion 31, to provide adequate shear resistance between leading and trailing portions 21, 31, while minimizing the structural instability of fairing 16. For example, during various towing and storage operations, shear stresses of varying magnitude are produced along the interface 25 which tend to cause transverse differential movements between leading and trailing portions 21, 31. The flange member 41 provides a discontinuity across the interface 25 to prevent such transverse differential movements and to increase the effective surface area of the interface 25 so that greater surface area is provided for bonding together leading and trailing portions 21, 31. Although the effective shear stresses along the interface 25, which is formed by regions 25a, 25b, and 25c, are reduced as the interface surface is increased; the flexibility of the trailing portion and the lateral stability of flange 41 are reduced as the dimensions of the flange member increase. Thus, optimization of the flange dimensions involves careful consideration of the allowable stress levels along interface 25, the desired flexibility of trailing portion 31, and the lateral stability of the fairing.

For particular loading conditions, the tensile stresses generated in the aft portion of flange member 41, adjacent surface 25c, are much higher than in the remainder of flange member 41. For example, during retrieval operations, fairing 16 is normally wound around drum 13 so that the fairing 16 is positioned perpendicular to the drum axis with leading portion 21 closer to the axis of drum 13 than trailing portion 31. This stretches the trailing or aft portion of flange 41 more than the leading or fore end portion of flange 41. Thus, if the flange member is excessively thick and has a modulus of elasticity (E) approaching that of the leading portion 21 of fairing 16, the fibers in the trailing edge portion of the flange member 41 may be subject to tensile failure and the matrix binding the fibers together may crack. Thus, for example, in a NACA-0020 shaped fairing having a cross-sectional length of 2.40 inches and a maximum cross-sectional thickness of 0.48 inches, the cross-sectional length of the leading portion 21 should be about 0.45 inches and the length of trailing portion 31 should be about 1.95 inches. For this type of fairing, the flange member 41 should have a cross-sectional width of between about 0.05 inches and 0.20 inches and cross-sectional thickness wherein the rear portion extends from about 0.05 inches to about 0.10 inches into the trailing portion 31. To suitably anchor and bond a separate flange member 41 to the leading portion 21, the forward portion of flange member should have a cross-sectional thickness of from about 0.05 inches to about 0.10 inches.

Other means for increasing the stability of the fairing 16 and for improving the bond strength of the interface between the leading and trailing portions 21, 31 of the fairing 16 are shown in FIGS. 5 and 6 wherein the flange members respectively have a dovetail and a rounded, nodular cross-section.

The flange member 42 of FIG. 5 includes a dovetailed-shaped segment 43 embedded in trailing portion 31 and a rectangular-shaped segment 44 designed for insertion into a comforming groove in the leading portion 21. The dovetailed shaped segment 43 constitutes a means for forming a strong joint between flange member 42 and trailing portion 31 of fairing 16 to preclude formation of small joint separations. In a fairing 16 having the abovementioned overall dimensions, the dovetailed segment 43 has a width of between about 0.10 inches and about 0.25 inches and depth of between about 0.05 and about 0.2 inches, and the rectangular segment 44 has a width of between about 0.05 inches and 0.15 inches.

Flange member 45 of FIG. 6 includes an enlarged, nodular or or bulbous segment 46 embedded in the trailing portion 31 and a rectangular segment 47 embedded in the leading portion 21. The arcuate surfaces of the bulbous segment 46 provide a smooth interface with the trailing portion 31 without the formation of stress and surface discontinuities thereabout. In general, the bulbous segment 46 has the same dimensions as the dovetailed segment 43.

For fairings having other than the abovementioned overall dimensions, the fairing should be constructed so that leading portion has a cross-sectional length which is between about 10 to about 20 percent of the cross-sectional chord length of the fairing. Further, the flange members should have a cross-sectional width which is between about 10 to about 50 percent of the maximum cross-sectional thickness of the fairing, and a cross-sectional length which is between about 5 to about 15 percent of the cross-sectional chord length of the fairing, wherein the flange member extends into the trailing portion to a depth of from about 3 to about 10 percent of the chord length of the fairing.

The drag stability of fairing 16 may be increased by truncating the trailing end 32, as shown in FIGS. 2 through 6. The truncated end portion 32 forms a hydrodynamic discontinuity which produces "bluff body" drag forces thereabout that promote rotational stability on fairing 16 about the axis or center of rotation (CR). In general, the width of the truncated trailing end 32 should be less than 40 percent of maximum cross-sectional width of the fairing and less than 20 percent of the cross-sectional chord length of the fairing so that the "bluff body" drag forces are maintained in a compatible relationship with the other hydrodynamic drag forces.

Fairing 16 is constructed by forming a channel in the rear surface of leading portion 21 and then bonding flange member 41 in the channel. Alternatively, flange member 41 may be formed as an integral extension of leading portion 21. Subsequently, the trailing portion 31 is bonded to both the flange member 41 and leading portion 21 to form the integrated fairing 16. Thereafter, the fairing is trimmed to a preselected profile and encased with cover 19.

Obviously many modifications and variations of the present invention are possible in light of the above teachings. It is therefore to be understood that within the scope of the appended claims, the invention may be practiced otherwise than as specifically described.

What is claimed is:

1. An elongated, low-drag fairing for towing submerged objects comprises:
   an elongated leading edge tension member extending between the submerged object and the towing vessel for withstanding the towing load of an underwater object, said leading member being formed of a composite material including a resin with high tensile strength fibers running parallel with the elongate dimension of said leading member, said leading member having a substantially U-shaped cross-section said leading member having a channel formed in the rear edge thereof;
   an elongated trailing edge member of flexible material, said leading and trailing members connected together to form an integrated fairing having a streamlined hydrofoil cross-sectional shape with a resultant hydrodynamic center located aft of the interface defined between said leading and trailing members, and said leading member having a cross-sectional length which is between about 10 percent and and 20 percent of the chord length of the fairing said trailing member having a channel formed in the front edge thereof, said leading member channel and said trailing member channel being adjacently arranged so as to form a composite channel; and
   means for preventing relative displacements between said leading and trailing members and for improving the shape stability of the fairing, said means comprises an elongated flange member embedded in said composite channel and having a forward portion integrally secured to said leading member and a rear portion bonded to said trailing member, said flange has a maximum cross-section width between about 5 percent and about 50 percent of the maximum cross-sectional width of the fairing, said flange has a cross-sectional length which is between about 5 percent and about 15 percent of the cross-sectional chord length of the fairing, said rear portion of said flange is embedded in said trailing member to a depth of between about 3 percent and about 10 percent of the cross-sectional chord length of the fairing.

2. The fairing according to claim 1, further comprising a covering of elastomer coated fabric substantially encasing said leading and trailing members.

3. The fairing according to claim 1, wherein said flange has a modulus of elasticity which is greater than the modulus of elasticity of said trailing member.

4. The fairing according to claim 1, wherein said trailing member has an aft end portion which tapers to a truncated aft surface, and wherein said tuncated aft surface has a width dimension which is not greater than 20 percent of the chord length of the fairing and 40 percent of the maximum width of the fairing.

5. The fairing according to claim 1 wherein said flange has a rectangular cross-section.

6. The fairing according to claim 1, wherein said forward flange portion has a rectangular cross-section and said rear flange portion has a trapezoidal cross-section.

7. The fairing according to claim 1, wherein said forward flange-portion has a rectangular cross-section and said rear flange portion has a bulbous cross-section.

8. An elongate, low-drag fairing for towing submerged objects, comprises:
   an elongate leading edge tension member extending between the submerged object and the towing vessel for withstanding the towing load of an underwater object, said leading member being formed of a composite material including a resin with high tensile strength fibers running parallel with the elongate dimension of said leading member, said leading member having a substantially U-shaped cross-section said leading member having a channel formed in the rear edge thereof;
   an elongated trailing edge member of flexible material, said leading and trailing member integrally bonded together to form an integrated fairing having a streamlined hydrofoil cross-section shape with a resultant hydrodynamic center located aft of the interface defined between said leading and trailing members, and said leading member having a cross-sectional length which is between about 10 percent and about 20 percent of the chord length of the fairing said trailing member having a channel formed in the front edge thereof, said leading member channel and said trailing member channel being adjacently arranged so as to form a composite channel; and
   a flange member embedded in said composite channel and secured to said leading and trailing members for preventing relative displacements between said leading and trailing members and for improving the shape stability of the fairing.

* * * * *